United States Patent [19]

Hamada et al.

[11] Patent Number: 4,758,388

[45] Date of Patent: Jul. 19, 1988

[54] METHOD OF MANUFACTURING CERAMIC VIBRATION PLATE FOR SPEAKER

[75] Inventors: Osamu Hamada; Megumi Omine, both of Amagasaki; Munehisa Sugimoto, Koriyama, all of Japan

[73] Assignee: Mitsubishi Denki Kabushiki Kaisha, Tokyo, Japan

[21] Appl. No.: 916,902

[22] Filed: Oct. 7, 1986

[30] Foreign Application Priority Data

Oct. 14, 1985 [JP] Japan ................................ 60-228173

[51] Int. Cl.[4] .............................................. C04B 35/64

[52] U.S. Cl. ........................................ 264/25; 264/81; 264/317; 219/121.66; 219/121.85

[58] Field of Search ........................... 264/81, 25, 317; 219/121 LF, 121 LM

[56] References Cited

U.S. PATENT DOCUMENTS 3,907,949 9/1975 Carlson .

FOREIGN PATENT DOCUMENTS 54-13968 6/1979 Japan .
57-4694 1/1982 Japan .
1155124 6/1969 United Kingdom .
1339733 12/1973 United Kingdom .
2123650 2/1984 United Kingdom .
2134748 8/1984 United Kingdom .

*Primary Examiner*—James Derrington
*Attorney, Agent, or Firm*—Sughrue, Mion, Zinn, Macpeak and Seas

[57] ABSTRACT

A dome shaped ceramic vibration plate for an audio speaker is manufactured by vacuum evaporation and deposition using a laser beam. The vibration plate is formed as a thin ceramic film which adheres to the surface of a mother model, which is thereafter dissolved or fused away.

9 Claims, 2 Drawing Sheets

METHOD OF MANUFACTURING CERAMIC VIBRATION PLATE FOR SPEAKER

FIELD OF THE INVENTION

This invention relates to a method of manufacturing a ceramic vibration plate for an audio speaker.

BACKGROUND OF THE INVENTION

Ceramic vibration plates for mid and high range speakers are generally configured as domes as shown in FIG. 1, wherein a vibration plate 1 is driven by a coil assembly 10 in the usual manner. Conventional methods for manufacturing such ceramic speaker vibration plates include machining, ceramic powder molding, and projection molding.

FIGS. 2(*a*) and 2(*b*) show the sequential steps involved in powder molding, wherein reference numeral 2 designates an outer mold, 3 is an upper punch, 4 is a lower punch, 5 is a spring, and 6 is a ceramic powder. In this method the powder 6 is placed in the cavity formed by the outer mold 2 and the lower punch 4 as shown in FIG. 2(*a*), whereafter the upper punch 3 is driven downwardly to compress the ceramic powder as shown in FIG. 2(*b*). The compressed powder is then sintered to harden it into the vibration plate 1.

FIGS. 3(*a*) and 3(*b*) show the sequential steps involved in projection molding, wherein reference numeral 7 designates a gun for projecting a ceramic powder, 8 is a mother model for the vibration plate, and 9 is a projected film. In this method the gun 7 projects the ceramic powder onto the surface of the mother model 8 to build up the film 9 as shown in FIG. 3(*a*), whereafter the mother model is withdrawn as shown in FIG. 3(*b*) to leave the vibration plate 1.

In the powder molding method the sintering time is undesirably long, and owing to the domed shape of the plate the compressive force is not uniformly distributed which results in the density of the ceramic powder being non-uniform. This adversely affects the speaker characteristics.

In the projection molding method the film 9 is generally porous, and it is difficult to form a sufficiently thin film. This problem is particularly acute for modern light weight speakers wherein the vibration plate is desirably only 30 $\mu m \sim 100$ $\mu m$ thick.

The machining method similarly presents problems because it is difficult to grind down the hard and brittle ceramic starting material or block, the apparatus needed to machine a dome shape is complex and costly, and considerable wastage of the expensive ceramic material is involved.

Other methods include chemical vapor deposition and ion plating, but they are limited to only certain types of ceramics and it is difficult to form a sufficiently thin film.

SUMMARY OF THE INVENTION

This invention avoids the above problems by providing a method of manufacturing a vibration plate for an audio speaker in which a laser beam is focused onto a slab of ceramic material disposed within a vacuum chamber to evaporate ceramic particles therefrom. Such particles migrate to a mother model in the chamber and adhere to its surface to form a thin ceramic film, whereafter the mother model is removed from the chamber and dissolved or fused away to leave just the ceramic film in the form of a domed vibration plate.

DETAILED DESCRIPTION OF THE PREFERRED EMBODIMENTS

Figure 1:
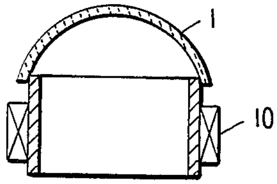
FIG.1 PRIOR ART
FIG. 1 is a sectional view of a conventional speaker vibration plate.
Figure 2A:
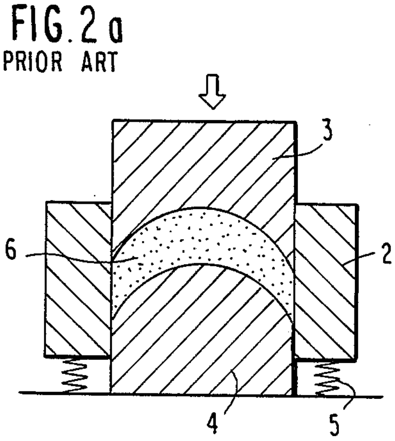
FIG.2a PRIOR ART
FIGS. 2(*a*) and 2(*b*) show sequential steps in a conventional method of compressively molding a ceramic powder.
Figure 2B:
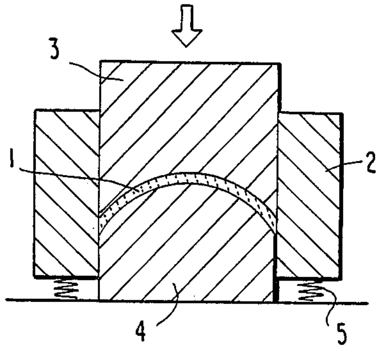
FIG.2b PRIOR ART
Figure 3A:
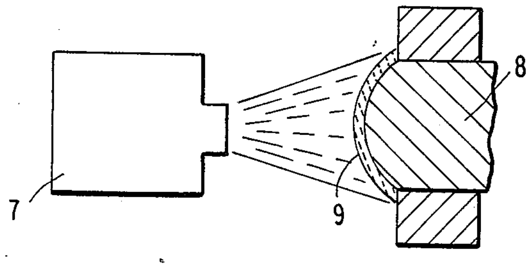
FIG.3a PRIOR ART
FIGS. 3(*a*) and 3(*b*) show sequential steps in a conventional method of projection molding a ceramic vibration plate.
Figure 3B:
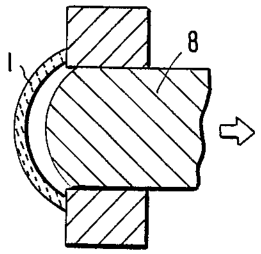
FIG.3b PRIOR ART
Figure 4:
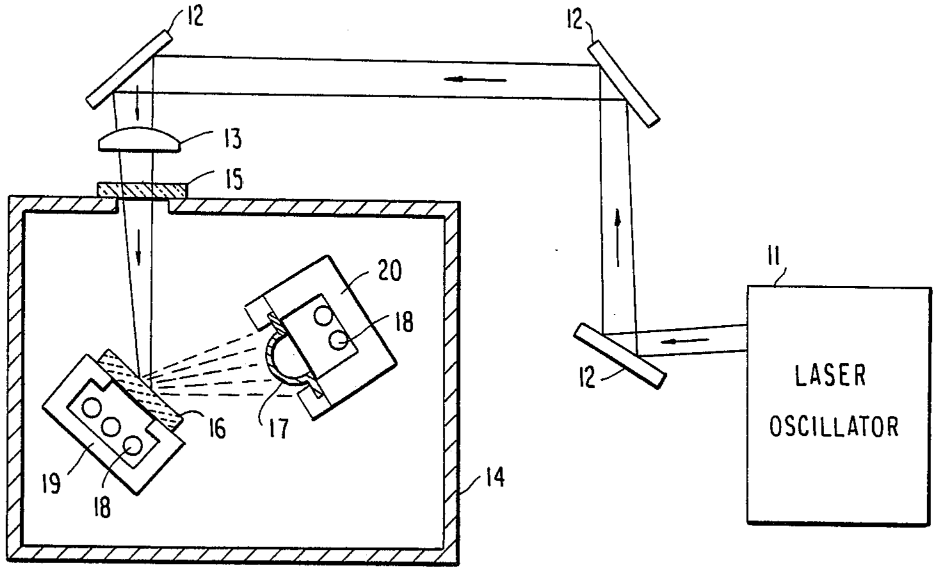
FIG. 4 is a schematic plan view, partly in section, of a vacuum evaporation apparatus using a laser for manufacturing a speaker vibration plate according to the invention.

Referring to FIG. 4, reference numeral 11 designates a $CO_2$ laser oscillator; reference numerals 12 are fully reflective mirrors, 13 is a focusing lens, 14 is a vacuum chamber or vessel depressurized to $10^{-4} \sim 10^{-6}$ torr., 15 is a transparent beam entry window, 16 is a block or slab of ceramic material, 17 is a mother model for a speaker vibration plate to which evaporated particles of the ceramic material adhere, such mother model being draw formed from a thin aluminum plate, numerals 18 designate heaters for heating the ceramic material and the mother model, 19 is a holder for the ceramic material, and 20 is a holder for the mother model.

Figure 5:
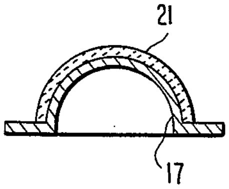
FIG. 5 is a sectional view of a mother model for forming a thin ceramic film by evaporation according to the invention.
Figure 6:
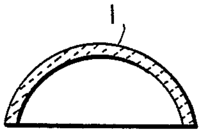
FIG. 6 is a sectional view of a speaker vibration plate after removal from the mother model according to the invention.

In operation, a laser beam emitted from the $CO_2$ oscillator 11 is reflected by the mirrors 12, focused by the lens 13, and applied to the ceramic material 16 through the window 15 to evaporate ceramic particles therefrom. The evaporated particles migrate and adhere to the mother model 17 to form a thin ceramic film on its surface, which is heated to a temperature of 300° C. ~ 800° C. to improve such adherence. The ceramic material 16 is also heated to a temperature of 300° C. ~ 800° C. to prevent any thermal cracking due to the localized heat generated by the incident laser beam. After forming a thin ceramic film 21 of preferred thickness as shown in FIG. 5, the mother model 17 is removed and immersed in a sodium hydroxide (NaOH) solution together with the attached ceramic film. The caustic solution dissolves away the thin aluminum plate from which the mother model is drawn in a relatively short time, leaving the vibration plate 1 as shown in FIG. 6.

As alternatives, the mother model can also be formed by casting a low fusing point metal, for example Wood's metal, in which case it is removed from the vibration plate film 21 by heating and fusion, and the $CO_2$ laser may be replaced by ruby or YAG lasers. The mirrors 12 may also be dispensed with if the laser beam from the oscillator is oriented directly at the focusing lens 13 just outside the vacuum chamber.

What is claimed is:

1. A method of manufacturing a ceramic vibration plate for an audio speaker, comprising the step of:

(a) disposing a ceramic material (16) in a vacuum vessel (14)

(b) disposing a dome-shaped mother model (17) for said vibration plate in the vacuum vessel, spaced from the ceramic material but having a direct, unobstructed path of communication therewith, (c) focusing a laser beam onto an exposed surface of the ceramic material to evaporate ceramic particles therefrom, (d) forming a thin, dome-shaped ceramic film (21) of predetermined thickness by adhering evaporated particles onto an exposed surface of the mother model, (e) removing the mother model and adhered film from the vessel, and (f) removing the mother model from the film to leave a dome-shaped ceramic vibration plate.

2. A method as defined in claim 1, wherein the mother model is made by draw forming a thin aluminum plate.

3. A method as defined in claim 2, wherein the mother model is removed from the film by dissolving it in a solution of NaOH.

4. A method as defined in claim 1, wherein the mother model is formed by casting a low fusing point metal.

5. A method as defined in claim 4, wherein the mother model is removed from the film by heating and fusion.

6. A method as defined in claim 1, wherein the laser beam is discharged from a $CO_2$ laser oscillator.

7. A method as defined in claim 1, wherein a heater (18) is disposed behind the exposed surface of the ceramic material to uniformly preheat said material during the impingement of the laser beam thereon to prevent any thermally induced cracking of said material due to localized heating by the focused laser beam.

8. A method as defined in claim 7, wherein a heater (18) is disposed behind the exposed surface of the mother model to uniformly preheat said mother model during the forming of the ceramic film to enhance the adherence of the evaporated particles on said mother model.

9. A method as defined in claim 8, wherein the preheating temperature of the ceramic material and the mother model are 300° C.–800° C.

* * * * *